(12) United States Patent
Muraki et al.

(10) Patent No.: US 8,248,754 B2
(45) Date of Patent: Aug. 21, 2012

(54) DIELECTRIC CERAMIC, METHOD FOR PRODUCING DIELECTRIC CERAMIC, AND MONOLITHIC CERAMIC CAPACITOR

(75) Inventors: Tomonori Muraki, Yasu (JP); Tomoyuki Nakamura, Moriyama (JP); Makoto Matsuda, Moriyama (JP); Hironori Suzuki, Yasu (JP); Takehisa Sasabayashi, Echizen (JP); Masayuki Ishihara, Yasu (JP); Akihiro Shiota, Yasu (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 349 days.

(21) Appl. No.: 12/540,743

(22) Filed: Aug. 13, 2009

(65) Prior Publication Data

US 2010/0053843 A1 Mar. 4, 2010

(30) Foreign Application Priority Data

Aug. 27, 2008 (JP) ................................. 2008-217585

(51) Int. Cl.
*H01G 4/06* (2006.01)
*C04B 35/00* (2006.01)

(52) U.S. Cl. .................. 361/321.4; 361/321.5; 501/137; 29/25.42

(58) Field of Classification Search .... 361/321.1–321.5, 361/311; 501/136, 139; 29/25.42
See application file for complete search history.

(56) References Cited

U.S. PATENT DOCUMENTS

| 4,950,427 A | 8/1990 | Endo |
| 171,938 A | 3/1998 | Sano et al. |
| 6,930,876 B1 * | 8/2005 | Noguchi et al. ............. 361/311 |
| 2006/0232911 A1 * | 10/2006 | Ito et al. .................... 361/321.4 |

FOREIGN PATENT DOCUMENTS

| CN | 1337928 A | 2/2002 |
| CN | 1649049 A | 8/2005 |
| JP | 2001-089231 A | 4/2001 |
| JP | 2007-258661 A | 10/2007 |
| JP | 2008-066119 A | 3/2008 |
| JP | 2008-114619 A | 5/2008 |
| JP | 2008-133162 A | 6/2008 |
| JP | 2008-133163 A | 6/2008 |
| JP | 2009-119444 A | 6/2009 |
| JP | 2009-119613 A | 6/2009 |
| JP | 2009-119614 A | 6/2009 |
| WO | WO-2010-006633 A1 | 1/2010 |
| WO | WO-2010-006634 A1 | 1/2010 |

OTHER PUBLICATIONS

Japanese Office Action issued for counterpart Japanese Appl No. 2008-217585, issued Feb. 14, 2012 (and English translation).

* cited by examiner

*Primary Examiner* — Eric Thomas
(74) *Attorney, Agent, or Firm* — Dickstein Shapiro LLP

(57) ABSTRACT

A dielectric ceramic contains a barium titanate and Li. In the dielectric ceramic, the following inequalities are satisfied: $0.5 \leq e \leq 6.0$, $0.06 < Rg < 0.17$, and $\sigma g < 0.075$, where e is the content, in molar parts, of Li with respect to 100 molar parts of the titanate; Rg is the average size, in μm, of grains in the dielectric ceramic; and σg is the standard deviation, in μm, of the size of the grains.

20 Claims, 1 Drawing Sheet

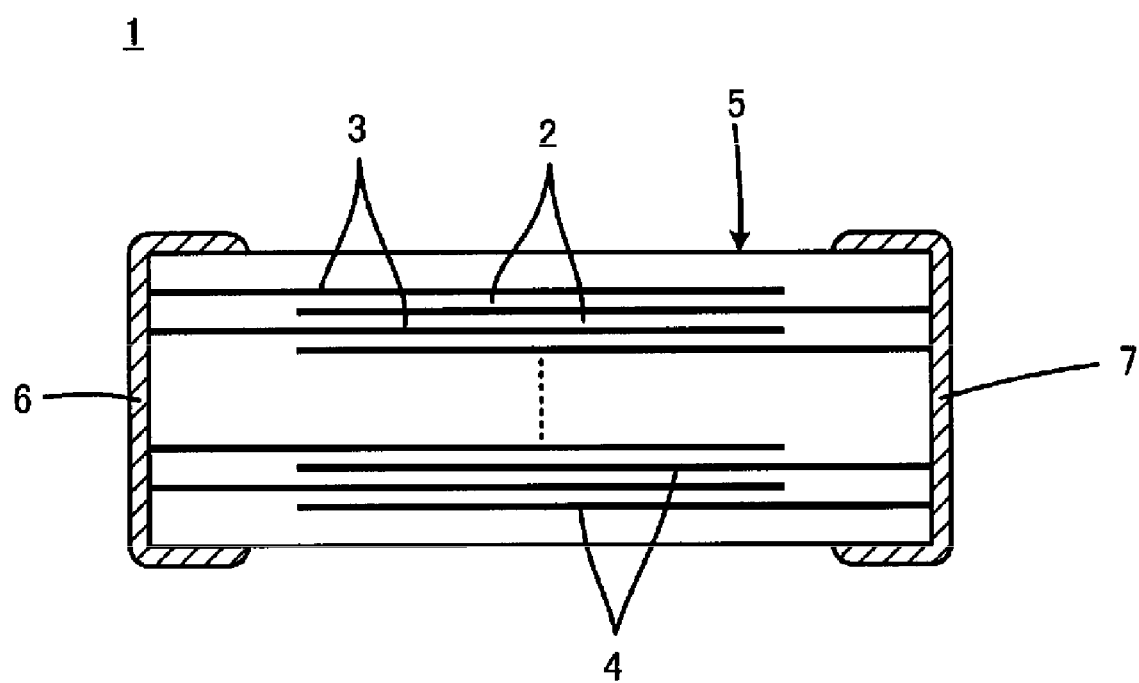

DIELECTRIC CERAMIC, METHOD FOR PRODUCING DIELECTRIC CERAMIC, AND MONOLITHIC CERAMIC CAPACITOR

BACKGROUND OF THE INVENTION

1. Field of the Invention

The present invention relates to dielectric ceramics, methods for producing the dielectric ceramics, and monolithic ceramic capacitors. The present invention particularly relates to an improvement in thickness reduction for dielectric ceramic layers for use in monolithic ceramic capacitors.

2. Description of the Related Art

Monolithic ceramic capacitors include capacitor bodies including a plurality of stacked dielectric ceramic layers and a plurality of internal electrodes extending between the dielectric ceramic layers. External electrodes are disposed on end surfaces of the capacitor body that are opposed to each other. The external electrode electrically connects the internal electrodes to each other. Some of the internal electrodes are electrically connected to one of the external electrodes and the other internal electrodes are electrically connected to the other one. The internal electrodes electrically connected to one of the external electrodes and the internal electrodes electrically connected to the other one are alternately arranged in the stacking direction of the dielectric ceramic layers.

The conductive material contained in the internal electrodes is usually Ni for cost reduction. In the manufacture of the monolithic ceramic capacitors, the capacitor bodies are fired such that the dielectric ceramic layers are sintered. The capacitor bodies need to be fired at a time when the internal electrodes are arranged in the capacitor bodies. Ni, which is contained in the internal electrodes, is a base metal and therefore the capacitor bodies need to be fired in reducing atmospheres.

The dielectric ceramic contained in the dielectric ceramic layers is usually $BaTiO_3$, which has a high dielectric constant.

Thin dielectric ceramic layers are used to manufacture monolithic ceramic capacitors with high capacitance per unit volume.

It is effective to use the thin dielectric ceramic layers in combination with thin internal electrodes. However, the thin internal electrodes are likely to be spheroidized while being fired in reducing atmospheres and therefore are readily broken. In order to avoid such a problem, the thin dielectric ceramic layers can be sintered by low-temperature firing. Adding sintering aids containing, for example, $SiO_2$, to ceramic materials is effective to allow the ceramic materials to be sintered at low temperature. Japanese Unexamined Patent Application Publication No. 2001-89231 (hereinafter referred to as Patent Document 1) discloses that lithium is effective in achieving low-temperature sintering.

In particular, Patent Document 1 discloses a dielectric ceramic composition containing a lithium compound and a major component containing 89% to 97% barium titanate in terms of $BaTiO_3$, 0.1% to 10% yttrium oxide in terms of $Y_2O_3$, 0.1% to 7% magnesium oxide in terms of MgO, 0.01% to 0.3% vanadium oxide in terms of $V_2O_5$, 0.5% or less manganese oxide in terms of MnO, and 0.5% to 7% barium calcium silicate in terms of $(Ba, Ca) SiO_3$, on a molar basis. The content of the lithium compound is 0.01 to 5.0 weight percent in terms of $Li_2O$ with respect to 100 mole percent of the major component.

Patent Document 1 indicates that lithium in the dielectric ceramic composition acts as a sintering aid and is involved in enhancing the temperature coefficient of dielectric constant of the dielectric ceramic composition.

On the other hand, compact monolithic ceramic capacitors are increasingly being demanded and therefore dielectric ceramic layers with a thickness of less than about 1 μm are demanded. The electric field applied to a dielectric ceramic layer increases with a reduction in the thickness of the dielectric ceramic layer. Therefore, in order to cope with the above demand, dielectric ceramics contained in the dielectric ceramic layers need to have good insulating properties and life properties. However, there is a problem in that the use of the dielectric ceramic composition disclosed in Patent Document 1 is not effective in achieving sufficient life properties.

SUMMARY OF THE INVENTION

Accordingly, it is an object of the present invention to provide a dielectric ceramic capable of solving the above problem, a method for producing the dielectric ceramic, and a monolithic ceramic capacitor containing the dielectric ceramic.

An embodiment of the present invention is directed to a dielectric ceramic containing $BaTiO_3$ and Li. In the dielectric ceramic, the following inequalities are satisfied: $0.5 \leq e \leq 6.2$, $0.06 < Rg < 0.17$, and $\sigma g < 0.075$, where e is the content, in molar parts, of Li with respect to about 100 molar parts of $BaTiO_3$; Rg is the average size, in μm, of grains in the dielectric ceramic; and σg is the standard deviation, in μm, of the size of the grains.

The dielectric ceramic preferably has the formula $100 (Ba_{1-x}Ca_x)_m TiO_3 + aRO_{3/2} + bMgO + cMO + dSiO_2 + eLiO_{1/2}$, wherein m, a, b, c, d, and e are mole numbers; R is at least one selected from the group consisting of La, Ce, Pr, Nd, Sm, Eu, Gd, Tb, Dy, Ho, Er, Tm, Yb, Lu, and Y; M is at least one of Mn and V; $0.96 \leq m \leq 1.03$; $0 \leq x \leq 0.2$; $0.2 \leq a \leq 5.0$; $0 \leq b \leq 2.0$; $0.2 \leq c \leq 1.0$; and $0.5 \leq d \leq 4.0$.

In the dielectric ceramic, the inequalities $0.06 < Rg < 0.14$ and $\sigma g < 0.075$ are preferably satisfied.

Another embodiment of the present invention is directed to a monolithic ceramic capacitor. The monolithic ceramic capacitor includes a capacitor body including a plurality of stacked dielectric ceramic layers and a plurality of internal electrodes extending between the dielectric ceramic layers and also includes a plurality of external electrodes which are located on different surfaces of the capacitor body and which are electrically connected to the internal electrodes.

In the monolithic ceramic capacitor, the dielectric ceramic layers located between the internal electrodes adjacent to each other in the stacking direction of the internal electrodes have a thickness of less than about 1 μm and are made of the above dielectric ceramic.

Another embodiment of the present invention is directed to a method for producing a dielectric ceramic.

The method includes a step of preparing a ceramic powder principally containing $BaTiO_3$; a step of preparing a minor component containing a Li compound; a step of preparing a ceramic source powder by mixing the $BaTiO_3$ ceramic powder with the minor component; a step of forming the ceramic source powder into a ceramic form; and a step of firing the ceramic form, wherein the following inequalities are satisfied: $0.5 \leq e \leq 6.2$, $0.06 < Rb < 0.17$, and $\sigma b < 0.065$, where e is the content, in molar parts, of Li in the ceramic source powder with respect to 100 molar parts of $BaTiO_3$; Rb is the average particle size, in μm, of the $BaTiO_3$ ceramic powder; and σb is the standard deviation, in μm, of the particle size of the $BaTiO_3$ ceramic powder.

A dielectric ceramic according to an embodiment of the present invention contains Li and has a sufficiently small grain size and substantially no coarse grains are present in the dielectric ceramic. Therefore, in the case where the dielectric ceramic is used to form dielectric ceramic layers for use in a monolithic ceramic capacitor, the monolithic ceramic capacitor can achieve good life properties even if the dielectric ceramic layers have a thickness of less than about 1 µm.

The dielectric ceramic has the formula $100(Ba_{1-x}Ca_x)_m TiO_3+aRO_{3/2}+bMgO+cMO+dSiO_2+eLiO_{1/2}$, wherein m, a, b, c, d, and e are mole numbers; R is at least one selected from the group consisting of La, Ce, Pr, Nd, Sm, Eu, Gd, Tb, Dy, Ho, Er, Tm, Yb, Lu, and Y; M is at least one of Mn and V; $0.96 \leq m \leq 1.03$; $0 \leq x \leq 0.2$; $0.2 \leq a \leq 5.0$; $0 \leq b \leq 2.0$; $0.2 \leq c \leq 1.0$; and $0.5 \leq d \leq 4.0$. This allows the monolithic ceramic capacitor to achieve better life properties.

In the dielectric ceramic, the inequalities $0.06<Rg<0.17$ and $\sigma g<0.075$ are preferably satisfied. This allows the monolithic ceramic capacitor to achieve better life properties.

In a method for producing a dielectric ceramic according to an embodiment of the present invention, an appropriate amount of Li is added to a major component powder with a sharp particle size distribution; hence, grains with a sharp size distribution can be obtained because particles are appropriately prevented from growing during firing. Therefore, in the case where a dielectric ceramic produced by the method is used to form dielectric ceramic layers for use in a monolithic ceramic capacitor, the monolithic ceramic capacitor can achieve good life properties even if the dielectric ceramic layers have a thickness of less than about 1 µm.

Other features, elements, characteristics and advantages of the present invention will become more apparent from the following detailed description of preferred embodiments of the present invention with reference to the attached drawing.

BRIEF DESCRIPTION OF THE DRAWING

FIG. 1 is a schematic sectional view of a monolithic ceramic capacitor according to an embodiment of the present invention.

DESCRIPTION OF THE PREFERRED EMBODIMENTS

FIG. 1 shows a monolithic ceramic capacitor 1 according to an embodiment of the present invention in cross section.

The monolithic ceramic capacitor 1 includes a capacitor body 5 including a plurality of stacked dielectric ceramic layers 2, a plurality of first internal electrodes 3, and a plurality of second internal electrodes 4. The first and second internal electrodes 3 and 4 extend between the dielectric ceramic layers 2 and are made of, for example, Ni.

The monolithic ceramic capacitor 1 further includes a first external electrode 6 and second external electrode 7 located on different surfaces of the capacitor body 5. The first and second external electrodes 6 and 7 are made of, for example, Cu. In the monolithic ceramic capacitor 1, the first and second external electrodes 6 and 7 are disposed on end surfaces of the capacitor body 5 that are opposed to each other as shown in FIG. 1. The first internal electrodes 3 are electrically connected to the first external electrode 6 and the second internal electrodes 4 are electrically connected to the second external electrode 7. The first and second internal electrodes 3 and 4 are alternately arranged in the stacking direction of the dielectric ceramic layers 2.

In the monolithic ceramic capacitor 1, the dielectric ceramic layers 2 located between the first and second internal electrodes 3 and 4 adjacent to each other have a thickness of less than about 1 µm.

The dielectric ceramic layers 2 are made of a dielectric ceramic containing $BaTiO_3$, which is a major component, and Li, which is derived from a minor component. In the dielectric ceramic, the following inequalities are satisfied: $0.5 \leq e \leq 6.2$, $0.06<Rg<0.17$, and $\sigma g<0.075$, wherein e is the content, in molar parts, of Li with respect to about 100 molar parts of $BaTiO_3$; Rg is the average size, in µm, of grains in the dielectric ceramic; and $\sigma g$ is the standard deviation, in µm, of the size of the grains.

Since the dielectric ceramic, which is contained in the dielectric ceramic layers 2, contains Li and has a sufficiently small grain size and no coarse grains are present in the dielectric ceramic, the monolithic ceramic capacitor 1 has good life properties although the dielectric ceramic layers 2 have a small thickness of less than about 1 µm.

In view of the enhancement of life properties, the dielectric ceramic preferably has the formula $100(Ba_{1-x}Ca_x)_{mTiO3}+aRO_{3/2}+bMgO+cMO+dSiO_2+eLiO_{1/2}$, wherein m, a, b, c, d, and e are mole numbers; R is at least one selected from the group consisting of La, Ce, Pr, Nd, Sm, Eu, Gd, Tb, Dy, Ho, Er, Tm, Yb, Lu, and Y; M is at least one of Mn and V; $0.96 \leq m \leq 1.03$; $0 \leq x \leq 0.2$; $0.2 \leq a \leq 5.0$; $0 \leq b \leq 2.0$; $0.2 \leq c \leq 1.0$; and $0.5 \leq d \leq 4.0$.

In view of the enhancement of life properties, the inequalities $0.06<Rg<0.14$ and $\sigma g<0.75$ are preferably satisfied, Rg and $\sigma b$ being as described above.

In the manufacture of the monolithic ceramic capacitor 1, the green capacitor body 5 is prepared and then fired. The green capacitor body 5 is obtained in such a manner that green ceramic sheets including green ceramic sheets having conductive paste films for forming the first or second internal electrodes 3 or 4 are stacked. The green ceramic sheets are converted into the dielectric ceramic layers 2, which are included in the capacitor body 5, by firing.

In order to prepare the green ceramic sheets, a $BaTiO_3$ ceramic powder made of $BaTiO_3$ is prepared. In the $BaTiO_3$ ceramic powder, the following inequalities are satisfied: $0.06<Rb<0.17$ and $\sigma b<0.065$, wherein Rb is the average particle size, in µm, of the $BaTiO_3$ ceramic powder and $\sigma b$ is the standard deviation, in µm, of the particle size of the $BaTiO_3$ ceramic powder.

The minor component is prepared. The minor component contains a Li compound.

The $BaTiO_3$ ceramic powder is mixed with the minor component, whereby a ceramic source powder is obtained. In the ceramic source powder, the inequality $0.5 \leq e \leq 6.2$ is satisfied, wherein e is the content, in molar parts, of Li in the ceramic source powder with respect to about 100 molar parts of $BaTiO_3$.

The ceramic source powder is mixed with a binder and an organic solvent, whereby a ceramic slurry is prepared. The ceramic slurry is sheeted, whereby the green ceramic sheets are obtained.

Since the green ceramic sheets contain the $BaTiO_3$ ceramic powder and an appropriate amount of Li and the $BaTiO_3$ ceramic powder has a sharp particle size distribution, particles of the $BaTiO_3$ ceramic powder are appropriately prevented from growing during the firing step in which the capacitor body 5 is prepared; hence, grains (particles in a sintered body) having a sharp size distribution are obtained. Therefore, although the dielectric ceramic layers 2 have a small thickness of less than about 1 µm, the monolithic ceramic capacitor 1 can achieve good life properties.

The monolithic ceramic capacitor 1 is not limited to that having a structure shown in FIG. 1. The monolithic ceramic capacitor 1 may be a capacitor having a structure in which a plurality of internal electrodes arranged in a capacitor body form a series capacitance, an array-type monolithic ceramic capacitor, or a monolithic ceramic capacitor having low equivalent series inductance (ESL) and a multi-terminal structure.

EXPERIMENTS

Experiments based on the present invention are described below.

Experiment 1

Experiment 1 was performed to investigate the influences of the size distribution of grains and the content of Li on life properties.
(A) Preparation of Dielectric Source Compositions $Ba_{1.007}TiO_3$ powders having average particle sizes Rg and standard deviations σb shown in Table 1 were prepared from $BaCO_3$ and $TiO_2$, which were starting materials for a major component. The average particle size Rg of each $Ba_{1.007}TiO_3$ powder and the standard deviation σb of the particle size of the $Ba_{1.007}TiO_3$ powder were determined in such a manner that about 300 particles of the Ba1.007TiO3 powder were analyzed with a field emission-scanning electron microscope (FE-SEM) and the average equivalent circle diameter of the particles was calculated. After being weighed, the $Ba_{1.007}TiO_3$ powder was wet-mixed with water in a ball mill, whereby aggregates of the $Ba_{1.007}TiO_3$ powder were broken.

Powders of $Dy_2O_3$, $MgCO_3$, $MnCO_3$, $SiO_2$, and $Li_2CO_3$, which were starting materials for minor components, were prepared. These powders were mixed with the $Ba_{1.007}TiO_3$ powder such that the mixture had the formula $100Ba_{1.007}TiO_3 + 1.0DyO_{3/2} + 0.7MgO + 0.3MnO + 1.5SiO_2 + eLiO_{1/2}$ and a Li content, represented by e in this formula, shown in Table 1. The mixture was mixed with water in a ball mill and then dried. Dielectric source compositions for Samples 1 to 18 were prepared as described above. Samples 1 to 18 were substantially the same in average particle size Rg, standard deviation σb, and Li content e. Samples 1 to 9 are different in ceramic layer thickness from Samples 10 to 18.

TABLE 1

| Samples | Average particle size Rg (μm) | Standard deviation σb (μm) | Li content e (molar parts) | Ceramic layer thickness (μm) |
|---|---|---|---|---|
| 1 | 0.1 | 0.04 | 3.5 | 0.9 |
| 2 | 0.1 | 0.065 | 3.5 | 0.9 |
| 3 | 0.06 | 0.03 | 3.5 | 0.9 |
| 4 | 0.17 | 0.04 | 3.5 | 0.9 |
| 5 | 0.17 | 0.07 | 3.5 | 0.9 |
| 6 | 0.1 | 0.04 | 0.4 | 0.9 |
| 7 | 0.1 | 0.04 | 6.2 | 0.9 |
| 8 | 0.1 | 0.05 | 0.4 | 0.9 |
| 9 | 0.17 | 0.075 | 0.4 | 0.9 |
| 10 | 0.1 | 0.04 | 3.5 | 1.0 |
| 11 | 0.1 | 0.065 | 3.5 | 1.0 |
| 12 | 0.06 | 0.03 | 3.5 | 1.0 |
| 13 | 0.17 | 0.04 | 3.5 | 1.0 |
| 14 | 0.17 | 0.07 | 3.5 | 1.0 |
| 15 | 0.1 | 0.04 | 0.4 | 1.0 |
| 16 | 0.1 | 0.04 | 6.2 | 1.0 |
| 17 | 0.1 | 0.05 | 0.4 | 1.0 |
| 18 | 0.17 | 0.075 | 0.4 | 1.0 |

(B) Preparation of Samples

Each dielectric source composition was wet-mixed with a polyvinyl butyral binder and ethanol in a ball mill, whereby a ceramic slurry was prepared. The ceramic slurry was sheeted with a lip coater, whereby two types of green ceramic sheets were prepared such that fired ceramic sheets had a thickness of about 0.9 or 1.0 μm.

A conductive paste principally containing Ni was applied to the green ceramic sheets by screen printing, whereby conductive paste films for forming internal electrodes were formed.

The green ceramic sheets having the conductive paste films were stacked such that exposed ends of the conductive paste films are alternately arranged, whereby green capacitor bodies were prepared. The green capacitor bodies were heated at about 300° C. in an $N_2$ atmosphere, whereby the polyvinyl butyral binder was burned out. The resulting green capacitor bodies were fired at about 1,025° C. for about two hours in a reducing atmosphere, containing $H_2$, $N_2$, and $H_2O$, with an oxygen partial pressure of about $10^{-10}$ MPa, whereby sintered capacitor bodies were obtained.

A Cu paste containing a $B_2O_3$—$Li_2O$—$SiO_2$—BaO glass frit was applied to both end surfaces of each of the sintered capacitor bodies, which were then baked at about 800° C. in an $N_2$ atmosphere such that external electrodes were formed so as to be electrically connected to the internal electrodes, whereby Samples 1 to 18 were obtained. Samples 1 to 18 were monolithic ceramic capacitors.

Samples 1 to 18 had a length of about 2.0 mm, a width of about 1.2 mm, and a thickness of about 1.0 mm and included dielectric ceramic layers, disposed between the internal electrodes, having a thickness shown in Table 2. The number of the effective dielectric ceramic layers of each sample was about 100. The dielectric ceramic layers each had an electrode area of about 1.4 $mm^2$.
(C) Evaluation of Samples Samples 1 to 18 were evaluated for dielectric constant, dielectric loss DF, temperature coefficient of capacitance, mean time to failure, and microstructure.

In order to determine the dielectric constant of each sample, the sample was measured for capacitance and dielectric loss DF under the following conditions: a temperature of about 25° C., a frequency of about 1 kHz, and an AC voltage of about 0.5 Vrms.

The temperature coefficient of capacitance of the sample is the change in capacitance associated with a temperature change. In particular, the temperature coefficient of capacitance thereof was determined to be the maximum change in capacitance over a range from about −55° C. to about 85° C. relative to the capacitance at about 25° C. A capacitance change of about −15% to 15% over a range from about −55° C. to about 85° C. meets the X5R characteristic of EIA standards.

In order to evaluate Samples 1 to 18 for high-temperature load life, Samples 1 to 18 were subjected to an accelerated reliability test in such a manner that the change in insulation resistance of each sample was monitored with time while a direct-current voltage of about 12.5 V was applied to the sample at about 150° C. In the accelerated reliability test, a sample with an insulation resistance of about $10^5$ Ω or less was determined to be defective and the mean time taken for the sample to fail, that is, the mean time to failure of the sample was determined.

Samples 1 to 18 were analyzed for ceramic microstructure. The average grain size Rg of each sample and the standard deviation σg of the grain size of the sample were determined in such a manner that a surface of the sample was observed with an FE-SEM and the average equivalent circle diameter of about 300 gains in the sample was calculated.

The evaluation results are summarized in Table 2.

TABLE 2

| Samples | Average grain size Rg (μm) | Standard deviation σg (μm) | Dielectric constant | Dielectric loss DF (%) | Temperature coefficient of capacitance (%) | Mean time to failure (hours) |
|---|---|---|---|---|---|---|
| 1 | 0.1 | 0.04 | 1800 | 1.8 | −8 | 170 |
| 2 | 0.1 | 0.075 | 1900 | 1.9 | −10 | 50 |
| 3 | 0.06 | 0.035 | 2300 | 2.2 | −14 | 10 |
| 4 | 0.17 | 0.045 | 1900 | 2 | −11 | 60 |
| 5 | 0.17 | 0.08 | 2000 | 2 | −12 | 10 |
| 6 | 0.1 | 0.045 | 2000 | 2 | −12 | 30 |
| 7 | 0.1 | 0.05 | 1800 | 1.9 | −11 | 70 |
| 8 | 0.1 | 0.06 | 2100 | 2.1 | −13 | 20 |
| 9 | 0.17 | 0.08 | 2400 | 2.3 | −14 | 10 |
| 10 | 0.1 | 0.045 | 1800 | 1.8 | −8 | 200 |
| 11 | 0.1 | 0.075 | 1900 | 1.9 | −10 | 160 |
| 12 | 0.06 | 0.04 | 2300 | 2.2 | −14 | 50 |
| 13 | 0.17 | 0.05 | 1900 | 2 | −11 | 160 |
| 14 | 0.17 | 0.075 | 2000 | 2 | −12 | 150 |
| 15 | 0.1 | 0.04 | 2000 | 2 | −12 | 160 |
| 16 | 0.1 | 0.05 | 1800 | 1.9 | −11 | 160 |
| 17 | 0.1 | 0.06 | 2100 | 2.1 | −13 | 70 |
| 18 | 0.17 | 0.08 | 2400 | 2.3 | −14 | 70 |

All the samples shown in Table 2 have a dielectric constant of about 1,500 or more, a dielectric loss of less than about 5%, and a temperature coefficient of capacitance meeting the X5R characteristic.

Samples 1 to 9 have a ceramic layer thickness of about 0.9 μm. In particular, Sample 1 satisfies the following three conditions and has good life properties: $0.5 \leqq e \leqq 6.2$, $0.06 < Rg < 0.17$, and $\sigma g < 0.075$, wherein e is the Li content in molar parts, Rb is the average grain size in μm, and σg is the standard deviation in μm. This shows that the synergy of the three factors Rg, σg, and e allows thin capacitors with a ceramic layer thickness of less than about 1 μm to have good life properties.

The reason for the above is probably as described below. When Li is present in a minor component and the content of Li therein is within a range defined by the inequality $0.5 \leqq e \leqq 6.2$, Li acts as an inhibitor to prevent the growth of grains and therefore the size distribution of the grains is narrow. A reduction in grain size distribution leads to an enhancement in reliability. In the case where a ceramic source powder principally containing a barium titanate ceramic is used when Li is present in the minor component within the range defined by the inequality $0.5 \leqq e \leqq 6.1$, the size distribution of grains in a sintered dielectric ceramic is remarkably narrow and therefore even a ceramic layer with a thickness of less than about 1.0 μm has a mean time to failure of about 100 hours or more as determined by the accelerated reliability test, that is, such a ceramic layer can be improved in reliability. In the ceramic source powder, the inequalities $0.06 < Rg < 0.17$, and $\sigma g < 0.075$ are satisfied, wherein Rg is the average grain size in μm and σg is the standard deviation in μm.

Samples 10 to 18 have a ceramic layer thickness of about 1.0 μm. In particular, Sample 10, as well as Sample 1, satisfies the following three conditions and has good life properties: $0.5 \leqq e \leqq 6.2$, $0.06 < Rg < 0.17$, and $\sigma g < 0.075$, wherein e is the Li content in molar parts, Rg is the average grain size in μm, and σg is the standard deviation in μm. For life properties, the difference between Sample 1, which has a ceramic layer thickness of less than about 1.0 μm and satisfies the three conditions, and Samples 2 to 9, which have a ceramic layer thickness of less than about 1.0 μm and satisfy none of the three conditions, is more significant than the difference between Sample 10, which has a ceramic layer thickness of about 1.0 μm or more and satisfies the three conditions, and Samples 11 to 18, which have a ceramic layer thickness of about 1.0 μm or more and satisfy none of the three conditions.

Experiment 2

Experiment 2 was performed to specify a composition range which is preferable in enhancing life properties.

(A) Preparation of Dielectric Source Compositions

Powders of $BaCO_3$, $CaCO_3$, and $TiO_2$, which were starting materials for a major component, were prepared and then weighed such that $(Ba_{1-x}Ca_x)_m TiO_3$ compositions were obtained, m and x being as shown in Table 3. The weighed $BaCO_3$, $CaCO_3$, and $TiO_2$ powders were heat-treated, whereby $(Ba_{1-x}Ca_x)_m TiO_3$ powders having average particle sizes Rb and standard deviations σb shown in Table 3 were obtained. After being weighed, each $(Ba_{1-x}Ca_x)_m TiO_3$ powder was wet-mixed with water in a ball mill, whereby aggregates of the $(Ba_{1-x}Ca_x)_m TiO_3$ powder were broken.

Powders of the following compounds were prepared: an oxide or carbonate of R, an oxide or carbonate of Mg, an oxide or carbonate of M, an oxide or carbonate of Si, and an oxide or carbonate of Li, R being at least one selected from the group consisting of La, Ce, Pr, Nd, Sm, Eu, Gd, Tb, Dy, Ho, Er, Tm, Yb, Lu, and Y, M being at least one of Mn and V, these compounds being starting materials for minor components. These powders were mixed with the $(Ba_{1-x}Ca_x)_m TiO_3$ powder such that the mixture had the formula $100(Ba_{1-x}Ca_x)_m TiO_3 + aRO_{3/2} + bMgO + cMO + dSiO_2 + eLiO_{1/2}$ and contained an M component and R component shown in Table 3, a, b, c, d, and e being as shown in Table 3. The mixture was mixed with water in a ball mill and then dried. Dielectric source compositions for Samples 101 to 128 were prepared as described above.

TABLE 3

| Samples | Average particle size Rg (μm) | Standard deviation σb (μm) | m | x | a | b | c | d | e | Breakdown of component represented by M | Breakdown of component represented by R |
|---|---|---|---|---|---|---|---|---|---|---|---|
| 101 | 0.11 | 0.04 | 0.960 | 0.00 | 1.0 | 0.8 | 0.4 | 1.5 | 3.5 | 0.2Mn, 0.2V | 1.0La |
| 102 | 0.11 | 0.04 | 1.030 | 0.00 | 1.0 | 0.8 | 0.4 | 1.5 | 3.5 | 0.2Mn, 0.2V | 1.0Ce |
| 103 | 0.11 | 0.04 | 1.007 | 0.00 | 1.0 | 0.8 | 0.4 | 1.5 | 3.5 | 0.2Mn, 0.2V | 1.0Pr |
| 104 | 0.10 | 0.04 | 1.007 | 0.20 | 1.0 | 0.8 | 0.4 | 1.5 | 3.5 | 0.2Mn, 0.2V | 1.0Nd |
| 105 | 0.10 | 0.04 | 1.007 | 0.10 | 0.2 | 0.8 | 0.4 | 1.5 | 3.5 | 0.2Mn, 0.2V | 0.2Sm |
| 106 | 0.11 | 0.04 | 1.007 | 0.00 | 5.0 | 0.8 | 0.4 | 1.5 | 3.5 | 0.2Mn, 0.2V | 5.0Eu |
| 107 | 0.11 | 0.04 | 1.007 | 0.00 | 1.0 | 0.0 | 0.4 | 1.5 | 3.5 | 0.2Mn, 0.2V | 1.0Gd |
| 108 | 0.11 | 0.04 | 1.007 | 0.00 | 1.0 | 2.0 | 0.4 | 1.5 | 3.5 | 0.2Mn, 0.2V | 1.0Tb |
| 109 | 0.11 | 0.04 | 1.007 | 0.00 | 1.0 | 0.8 | 0.2 | 1.5 | 3.5 | 0.1Mn, 0.1V | 1.0Dy |
| 110 | 0.11 | 0.04 | 1.007 | 0.00 | 1.0 | 0.8 | 1.0 | 1.5 | 3.5 | 0.4Mn, 0.4V | 1.0Ho |

TABLE 3-continued

| Samples | Average particle size Rg (μm) | Standard deviation σb (μm) | m | x | a | b | c | d | e | Breakdown of component represented by M | Breakdown of component represented by R |
|---|---|---|---|---|---|---|---|---|---|---|---|
| 111 | 0.11 | 0.04 | 1.007 | 0.00 | 1.0 | 0.8 | 0.4 | 1.5 | 3.5 | 0.4V | 1.0Er |
| 112 | 0.11 | 0.04 | 1.007 | 0.00 | 1.0 | 0.8 | 0.4 | 1.5 | 3.5 | 0.4Mn | 1.0Tm |
| 113 | 0.11 | 0.04 | 1.007 | 0.00 | 2.0 | 0.8 | 0.4 | 0.5 | 3.5 | 0.2Mn, 0.2V | 2.0Yb |
| 114 | 0.11 | 0.04 | 1.007 | 0.00 | 2.0 | 0.8 | 0.4 | 4.0 | 3.5 | 0.2Mn, 0.2V | 2.0Lu |
| 115 | 0.11 | 0.04 | 1.007 | 0.00 | 2.0 | 0.8 | 0.4 | 2.0 | 0.5 | 0.2Mn, 0.2V | 2.0Y |
| 116 | 0.11 | 0.04 | 1.007 | 0.00 | 2.0 | 0.8 | 0.4 | 2.0 | 6.0 | 0.2Mn, 0.2V | 1.0Y, 1.0Dy |
| 117 | 0.11 | 0.04 | 1.007 | 0.00 | 2.0 | 0.8 | 0.4 | 2.0 | 6.0 | 0.2Mn, 0.2V | 1.0Sm, 1.0Gd |
| 118 | 0.11 | 0.04 | 1.007 | 0.00 | 2.0 | 0.8 | 0.4 | 2.0 | 6.0 | 0.2Mn, 0.2V | 1.0Y, 1.0Gd |
| 119 | 0.10 | 0.04 | 0.959 | 0.10 | 1.0 | 0.8 | 0.4 | 1.5 | 3.5 | 0.2Mn, 0.2V | 1.0Tb |
| 120 | 0.10 | 0.04 | 1.031 | 0.10 | 1.0 | 0.8 | 0.4 | 1.5 | 3.5 | 0.2Mn, 0.2V | 1.0Dy |
| 121 | 0.10 | 0.04 | 1.007 | 0.21 | 1.0 | 0.8 | 0.4 | 1.5 | 3.5 | 0.2Mn, 0.2V | 1.0Ho |
| 122 | 0.11 | 0.04 | 1.007 | 0.00 | 0.1 | 0.8 | 0.4 | 1.5 | 3.5 | 0.2Mn, 0.2V | 0.1Ho |
| 123 | 0.11 | 0.04 | 1.007 | 0.00 | 5.1 | 0.8 | 0.4 | 1.5 | 3.5 | 0.2Mn, 0.2V | 5.1Ho |
| 124 | 0.11 | 0.04 | 1.007 | 0.00 | 1.0 | 2.1 | 0.4 | 1.5 | 3.5 | 0.2Mn, 0.2V | 1.0Yb |
| 125 | 0.11 | 0.04 | 1.007 | 0.00 | 1.0 | 0.8 | 0.1 | 1.5 | 3.5 | 0.05Mn, 0.05V | 1.0Tb |
| 126 | 0.11 | 0.04 | 1.007 | 0.00 | 1.0 | 0.8 | 1.1 | 1.5 | 3.5 | 0.5Mn, 0.6V | 1.0Dy |
| 127 | 0.11 | 0.04 | 1.007 | 0.00 | 1.0 | 0.8 | 0.4 | 0.4 | 3.5 | 0.2Mn, 0.2V | 1.0Ho |
| 128 | 0.11 | 0.04 | 1.007 | 0.00 | 1.0 | 0.8 | 0.4 | 4.1 | 3.5 | 0.2Mn, 0.2V | 1.0Er |

(B) Preparation of Samples

Samples 101 to 128 were prepared in substantially the same manner as that described in Experiment 1. Samples 101 to 128 were monolithic ceramic capacitors including dielectric ceramic layers with a thickness of about 0.8 μm.

(C) Evaluation of Samples

Samples 101 to 128 were evaluated in substantially the same manner as that described in Experiment 1. The evaluation results are summarized in Table 4.

TABLE 4

| Samples | Average grain size Rg (μm) | Standard deviation σg (μm) | Dielectric constant | Dielectric loss DF (%) | Temperature coefficient of capacitance (%) | Mean time to failure (hours) |
|---|---|---|---|---|---|---|
| 101 | 0.11 | 0.04 | 2200 | 2.3 | −9 | 160 |
| 102 | 0.11 | 0.04 | 1700 | 1.8 | −8 | 190 |
| 103 | 0.11 | 0.04 | 1900 | 2.0 | −9 | 180 |
| 104 | 0.10 | 0.04 | 2000 | 2.3 | −9 | 170 |
| 105 | 0.10 | 0.04 | 1900 | 2.1 | −10 | 180 |
| 106 | 0.11 | 0.04 | 1900 | 1.8 | −13 | 160 |
| 107 | 0.11 | 0.04 | 2000 | 1.8 | −9 | 160 |
| 108 | 0.11 | 0.04 | 1800 | 1.7 | −10 | 180 |
| 109 | 0.11 | 0.04 | 2100 | 2.1 | −10 | 160 |
| 110 | 0.11 | 0.04 | 1800 | 1.8 | −8 | 180 |
| 111 | 0.11 | 0.04 | 1900 | 2.0 | −8 | 190 |
| 112 | 0.11 | 0.04 | 1900 | 2.0 | −9 | 180 |
| 113 | 0.11 | 0.04 | 2000 | 2.2 | −11 | 160 |
| 114 | 0.11 | 0.04 | 2200 | 2.3 | −13 | 160 |
| 115 | 0.11 | 0.04 | 2100 | 2.1 | −11 | 160 |
| 116 | 0.11 | 0.04 | 1800 | 1.9 | −12 | 190 |
| 117 | 0.11 | 0.04 | 1700 | 1.9 | −13 | 180 |
| 118 | 0.11 | 0.04 | 1800 | 1.9 | −12 | 180 |
| 119 | 0.10 | 0.04 | 1900 | 2.0 | −14 | 130 |
| 120 | 0.10 | 0.04 | 1400 | 1.5 | −10 | 120 |
| 121 | 0.10 | 0.04 | 1600 | 1.7 | −14 | 130 |
| 122 | 0.11 | 0.04 | 1900 | 1.9 | −12 | 110 |
| 123 | 0.11 | 0.04 | 1700 | 1.8 | −17 | 140 |
| 124 | 0.11 | 0.04 | 1600 | 1.7 | −14 | 120 |
| 125 | 0.11 | 0.04 | 1800 | 1.8 | −13 | 110 |
| 126 | 0.11 | 0.04 | 1900 | 1.9 | −13 | 120 |
| 127 | 0.11 | 0.04 | 1700 | 1.8 | −14 | 110 |
| 128 | 0.11 | 0.04 | 2000 | 2.0 | −16 | 110 |

All the samples shown in Table 4 are within the scope of the present invention and have a dielectric loss of less than about 5% and a mean time to failure of about 110 hours or more.

Samples 101 to 118 have the $100(Ba_{1-x}Ca_x)_m TiO_3 + aRO_{3/2} + bMgO + cMO + dSiO_2 + eLiO_{1/2}$, wherein $0.96 \leq m \leq 1.03$, $0 \leq x \leq 0.2$, $0.2 \leq a \leq 5.0$, $0 \leq b \leq 2.0$, $0.2 \leq c \leq 1.0$, and $0.5 \leq d \leq 4.0$. Therefore, Samples 101 to 118 have a dielectric constant of about 1,500 or more, a temperature coefficient of capacitance meeting the X5R characteristic, and a mean time to failure of about 150 hours or more, that is, improved life properties.

Sample 119, in which m<0.960, has a mean time to failure of less than about 150 hours. Sample 120, in which m>1.030, has a dielectric constant of less than about 1,500 and a mean time to failure of less than about 150 hours.

Sample 121, in which x>0.20, has a mean time to failure of less than about 150 hours.

Sample 122, in which a<0.2, has a mean time to failure of less than about 150 hours. Sample 123, in which a>5.0, has a temperature coefficient of dielectric constant with an absolute value of about 15% or more and a mean time to failure of less than about 150 hours.

Sample 124, in which b>2.0, has a mean time to failure of less than about 150 hours.

Sample 125, in which c<0.2, has a mean time to failure of less than about 150 hours. Sample 126, in which c>1.0, has a mean time to failure of less than about 150 hours.

Sample 127, in which d<0.5, has a mean time to failure of less than about 150 hours. Sample 128, in which d>4.0, has a temperature coefficient of dielectric constant with an absolute value of about 15% or more and a mean time to failure of less than about 150 hours.

Experiment 3

Experiment 3 was performed to determine the preferable range of the average size of grains.

(A) Preparation of Dielectric Source Compositions

Dielectric source compositions for Samples 201 and 202 were prepared in substantially the same manner as that used to prepare Sample 1 in Experiment 1 except that $BaTiO_3$ powders having average particle sizes Rg and standard deviations σb shown in Table 5 were used.

TABLE 5

| Samples | Average particle size Rg (μm) | Standard deviation σb (μm) |
|---|---|---|
| 201 | 0.07 | 0.03 |
| 202 | 0.15 | 0.06 |

(B) Preparation of Samples

Samples 201 to 202 were prepared in substantially the same manner as that described in Experiment 1. Samples 201 to 202 were monolithic ceramic capacitors including dielectric ceramic layers with a thickness of about 0.9 μm.

(C) Evaluation of Samples

Samples 201 to 202 were evaluated in substantially the same manner as that described in Experiment 1. The evaluation results are summarized in Table 6.

TABLE 6

| Samples | Average grain size Rg | Standard deviation σg (μm) | Dielectric constant | Dielectric loss DF (%) | Temperature coefficient of capacitance (%) | Mean time to failure (hours) |
|---|---|---|---|---|---|---|
| 201 | 0.07 | 0.03 | 1700 | 1.8 | −7 | 170 |
| 202 | 0.15 | 0.06 | 2200 | 2.3 | −11 | 120 |

As shown in Table 6, Sample 201 satisfies the inequality $0.06<Rg<0.15$, wherein Rg is the average grain size in μm. Sample 202 does not satisfy this inequality. Sample 201 has better life properties as compared to Sample 202.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. A dielectric ceramic containing:
   barium titanate; and Li,
   wherein $0.5 \leq e \leq 6.2$, $0.06<Rg<0.17$, and $\sigma g<0.075$, where e is the content, in molar parts, of Li with respect to 100 molar parts of the titanate; Rg is the average size, in μm, of grains in the dielectric ceramic; and σg is the standard deviation, in μm, of the size of the grains.

2. The dielectric ceramic according to claim 1, having the formula $100(Ba_{1-x}Ca_x)_mTiO_3+aRO_{3/2}+bMgO+cMO+dSiO_2+eLiO_{1/2}$, wherein m, a, b, c, d, and e are mole numbers; R is at least one member selected from the group consisting of La, Ce, Pr, Nd, Sm, Eu, Gd, Tb, Dy, Ho, Er, Tm, Yb, Lu, and Y; M is at least one of Mn and V; $0.96 \leq m \leq 1.03$; $0 \leq x \leq 0.2$; $0.2 \leq a \leq 5.0$; $0 \leq b \leq 2.0$; $0.2 \leq c \leq 1.0$; and $0.5 \leq d \leq 4.0$.

3. The dielectric ceramic according to claim 2, wherein $e \leq 6.0$, $0.06<Rg<0.14$ and $\sigma g<0.075$.

4. The dielectric ceramic according to claim 3, wherein M is a combination of Mn and V; $1.00 \leq m \leq 1.03$; and x is 0.

5. A monolithic ceramic capacitor comprising:
   a capacitor body including a plurality of stacked dielectric ceramic layers and a plurality of internal electrodes each of which extends between adjacent dielectric ceramic layers; and
   a plurality of external electrodes which are located on different surfaces of the capacitor body and each of which is electrically connected to an internal electrodes,
   wherein the dielectric ceramic layers located between the internal electrodes adjacent to each other in the stacking direction of the internal electrodes have a thickness of less than 1 μm and are made of the dielectric ceramic according to claim 4.

6. A monolithic ceramic capacitor comprising:
   a capacitor body including a plurality of stacked dielectric ceramic layers and a plurality of internal electrodes each of which extends between adjacent dielectric ceramic layers; and
   a plurality of external electrodes which are located on different surfaces of the capacitor body and each of which is electrically connected to an internal electrodes,
   wherein the dielectric ceramic layers located between the internal electrodes adjacent to each other in the stacking direction of the internal electrodes have a thickness of less than 1 μm and are made of the dielectric ceramic according to claim 3.

7. A monolithic ceramic capacitor comprising:
   a capacitor body including a plurality of stacked dielectric ceramic layers and a plurality of internal electrodes each of which extends between adjacent dielectric ceramic layers; and
   a plurality of external electrodes which are located on different surfaces of the capacitor body and each of which is electrically connected to an internal electrodes,
   wherein the dielectric ceramic layers located between the internal electrodes adjacent to each other in the stacking direction of the internal electrodes have a thickness of less than 1 μm and are made of the dielectric ceramic according to claim 2.

8. The dielectric ceramic according to claim 1, wherein $0.06<Rg<0.14$ and $\sigma g<0.075$.

9. The dielectric ceramic according to claim 8, wherein $e \leq 6.0$ and $\sigma g<0.06$.

10. A monolithic ceramic capacitor comprising:
    a capacitor body including a plurality of stacked dielectric ceramic layers and a plurality of internal electrodes each of which extends between adjacent dielectric ceramic layers; and
    a plurality of external electrodes which are located on different surfaces of the capacitor body and each of which is electrically connected to an internal electrodes,
    wherein the dielectric ceramic layers located between the internal electrodes adjacent to each other in the stacking direction of the internal electrodes have a thickness of less than 1 μm and are made of the dielectric ceramic according to claim 9.

11. A monolithic ceramic capacitor comprising:
    a capacitor body including a plurality of stacked dielectric ceramic layers and a plurality of internal electrodes each of which extends between adjacent dielectric ceramic layers; and
    a plurality of external electrodes which are located on different surfaces of the capacitor body and each of which is electrically connected to an internal electrodes,
    wherein the dielectric ceramic layers located between the internal electrodes adjacent to each other in the stacking direction of the internal electrodes have a thickness of less than 1 μm and are made of the dielectric ceramic according to claim 8.

12. A monolithic ceramic capacitor comprising:
    a capacitor body including a plurality of stacked dielectric ceramic layers and a plurality of internal electrodes each of which extends between adjacent dielectric ceramic layers; and
    a plurality of external electrodes which are located on different surfaces of the capacitor body and each of which is electrically connected to an internal electrodes, wherein the dielectric ceramic layers located between the internal electrodes adjacent to each other in the stacking direction of the internal electrodes have a thickness of less than 1 μm and are made of the dielectric ceramic according to claim 1.

13. A method for producing a dielectric ceramic, comprising:
providing a ceramic source powder mixture of a ceramic powder principally containing a barium titanate and a minor component containing a Li compound;
forming the ceramic source powder into a ceramic form; and
firing the ceramic form,
wherein $0.5 \leq e \leq 6.2$, $0.06 < Rb < 0.17$, and $<0.075$, where e is the content, in molar parts, of Li in the ceramic source powder with respect to 100 molar parts of barium titanate; Rb is the average particle size, in μm, of the barium titanate ceramic powder; and σb is the standard deviation, in μm, of the particle size of the barium titanate ceramic powder.

14. The method to claim 13, wherein $e \leq 6.0$, $0.06 < Rb < 0.14$ and $\sigma g < 0.075$.

15. The method to claim 14, wherein $\sigma g < 0.06$.

16. The method to claim 15, wherein the barium titanate is 100 moles of $(Ba_{1-x}Ca_x)_m TiO_3$ in which $0.96 \leq m \leq 1.03$, and $0 \leq x \leq 0.2$; the ceramic source powder comprises $aRO_{3/2}$, bMgO, cMO, and $dSiO_2$, wherein m, a, b, c, and d, are mole numbers; R is at least one member selected from the group consisting of La, Ce, Pr, Nd, Sm, Eu, Gd, Tb, Dy, Ho, Er, Tm, Yb, Lu, and Y; M is at least one of Mn and V; $0.2 \leq a \leq 5.0$; $0 \leq b \leq 2.0$; $0.2 \leq c \leq 1.0$; and $0.5 \leq d \leq 4.0$.

17. The method to claim 14, wherein the barium titanate is 100 moles of $(Ba_{1-x}Ca_x)_m TiO_3$ in which $0.96 \leq m \leq 1.03$, and $0 \leq x \leq 0.2$; the ceramic source powder comprises $aRO_{3/2}$, bMgO, cMO, and $dSiO_2$, wherein m, a, b, c, and d, are mole numbers; R is at least one member selected from the group consisting of La, Ce, Pr, Nd, Sm, Eu, Gd, Tb, Dy, Ho, Er, Tm, Yb, Lu, and Y; M is at least one of Mn and V; $0.2 \leq a \leq 5.0$; $0 \leq b \leq 2.0$; $0.2 \leq c \leq 1.0$; and $0.5 \leq d \leq 4.0$.

18. The method to claim 13, wherein the barium titanate is 100 moles of $(Ba_{1-x}Ca_x)_m TiO_3$ in which $0.96 \leq m \leq 1.03$, and $0 \leq x \leq 0.2$; the ceramic source powder comprises $aRO_{3/2}$, bMgO, cMO, and $dSiO_2$, wherein m, a, b, c, and d, are mole numbers; R is at least one member selected from the group consisting of La, Ce, Pr, Nd, Sm, Eu, Gd, Tb, Dy, Ho, Er, Tm, Yb, Lu, and Y; M is at least one of Mn and V; $0.2 \leq a \leq 5.0$; $0 \leq b \leq 2.0$; $0.2 \leq c \leq 1.0$; and $0.5 \leq d \leq 4.0$.

19. A method for producing a dielectric ceramic, comprising:
providing a ceramic powder principally containing a barium titanate;
providing a minor component containing a Li compound;
preparing a ceramic source powder by mixing the barium titanate ceramic powder with the minor component;
forming the ceramic source powder into a ceramic form; and
firing the ceramic form,
wherein $0.5 \leq e \leq 6.2$, $0.06 < Rb < 0.17$, and $\sigma b < 0.065$, where e is the content, in molar parts, of Li in the ceramic source powder with respect to 100 molar parts of barium titanate; Rb is the average particle size, in μm, of the barium titanate ceramic powder; and σb is the standard deviation, in μm, of the particle size of the barium titanate ceramic powder.

20. The method to claim 19, wherein the barium titanate is $(Ba_{1-x}Ca_x)_m TiO_3$ in which $0.96 \leq m \leq 1.03$, and $0 \leq x \leq 0.2$; additionally provided are $aRO_{3/2}$, bMgO, cMO, and $dSiO_2$, wherein a, b, c, and d, are mole numbers; R is at least one member selected from the group consisting of La, Ce, Pr, Nd, Sm, Eu, Gd, Tb, Dy, Ho, Er, Tm, Yb, Lu, and Y; M is at least one of Mn and V; $0.2 \leq a \leq 5.0$; $0 \leq b \leq 2.0$; $0.2 \leq c \leq 1.0$; and $0.5 \leq d \leq 4.0$; and the additional provided $aRO_{3/2}$, bMgO, cMO, and $dSiO_2$ are incorporated in the ceramic source powder before firing.

\* \* \* \* \*